United States Patent [19]
Schmidt et al.

[11] Patent Number: 5,379,862
[45] Date of Patent: Jan. 10, 1995

[54] QUICK CHANGE EXPANDABLE OIL PAN

[76] Inventors: Barry Schmidt, 116 Brandy Run Rd.; Larry Metzler, 132 Whippoorwill Rd., both of Brando, Miss. 39042

[21] Appl. No.: 119,539
[22] Filed: Nov. 8, 1993
[51] Int. Cl.⁶ .............................................. F16N 31/00
[52] U.S. Cl. ...................................... 184/106; 141/98; 220/661; 220/904
[58] Field of Search .................. 141/98; 220/904, 661; 184/1.5, 106

[56] References Cited
U.S. PATENT DOCUMENTS

| | | | |
|---|---|---|---|
| 1,620,803 | 3/1927 | Curran | 220/904 |
| 2,837,860 | 6/1958 | Norling | 220/904 |
| 4,157,103 | 6/1979 | LaFleur | 141/98 |
| 4,673,081 | 6/1987 | Habig et al. | 141/98 |
| 4,802,599 | 2/1989 | Hill | 141/98 |
| 5,080,149 | 1/1992 | Peoples | 141/337 |
| 5,082,035 | 1/1992 | Maxwell | 141/98 |

Primary Examiner—Thomas E. Denion
Attorney, Agent, or Firm—Galgano & Burke

[57] ABSTRACT

An expandable pan for trapping and directing oil from a boat's engine in an ecologically safe manner. The pan comprises a bottom with a sloped false bottom to an outlet having a hose connection. The pan is provided with collapsible side walls and a top member with with an upwardly extending extension to receive the oil from the engine oil pan.

1 Claim, 2 Drawing Sheets

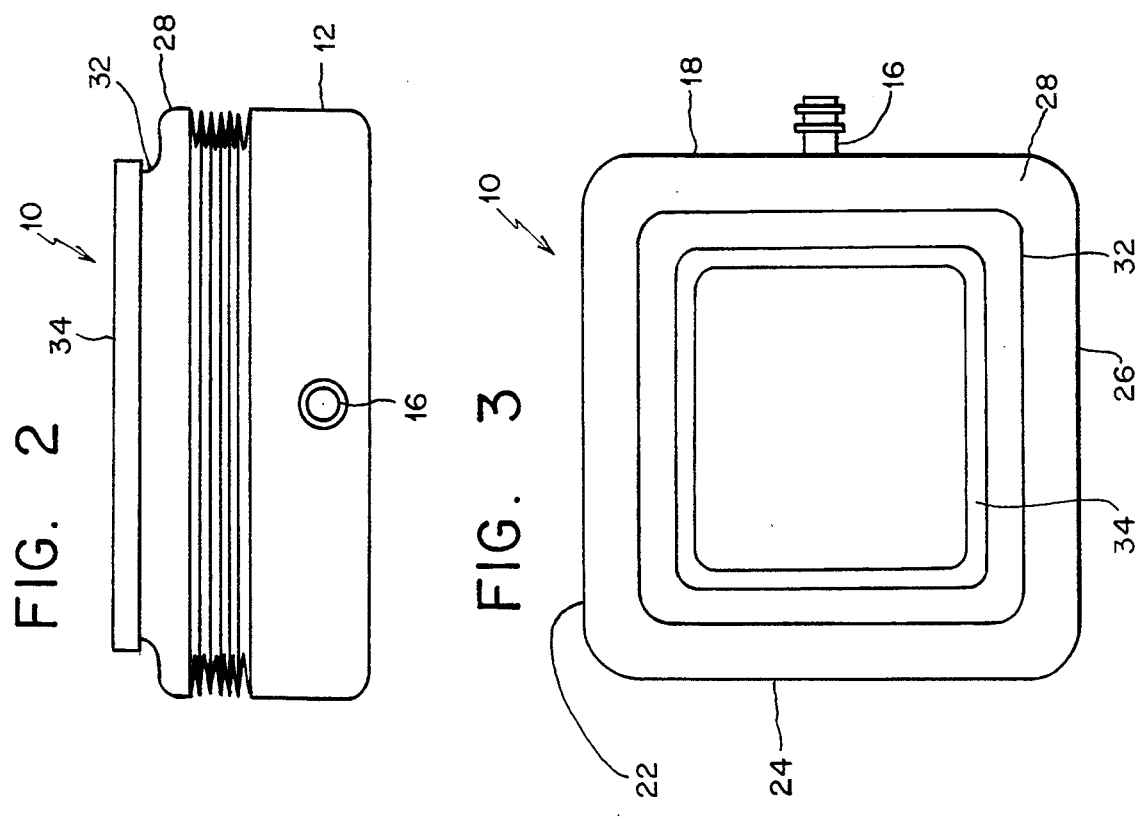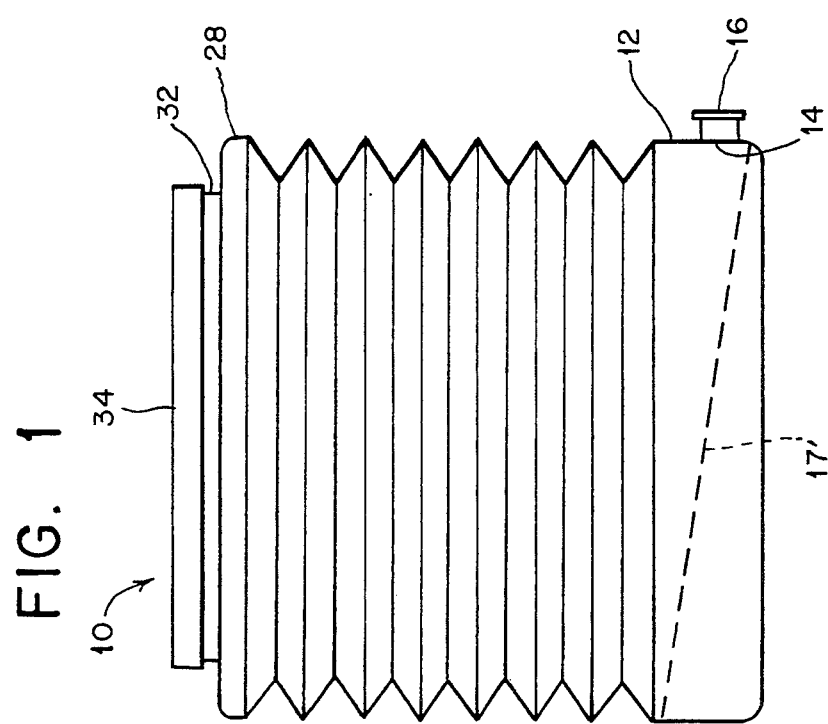

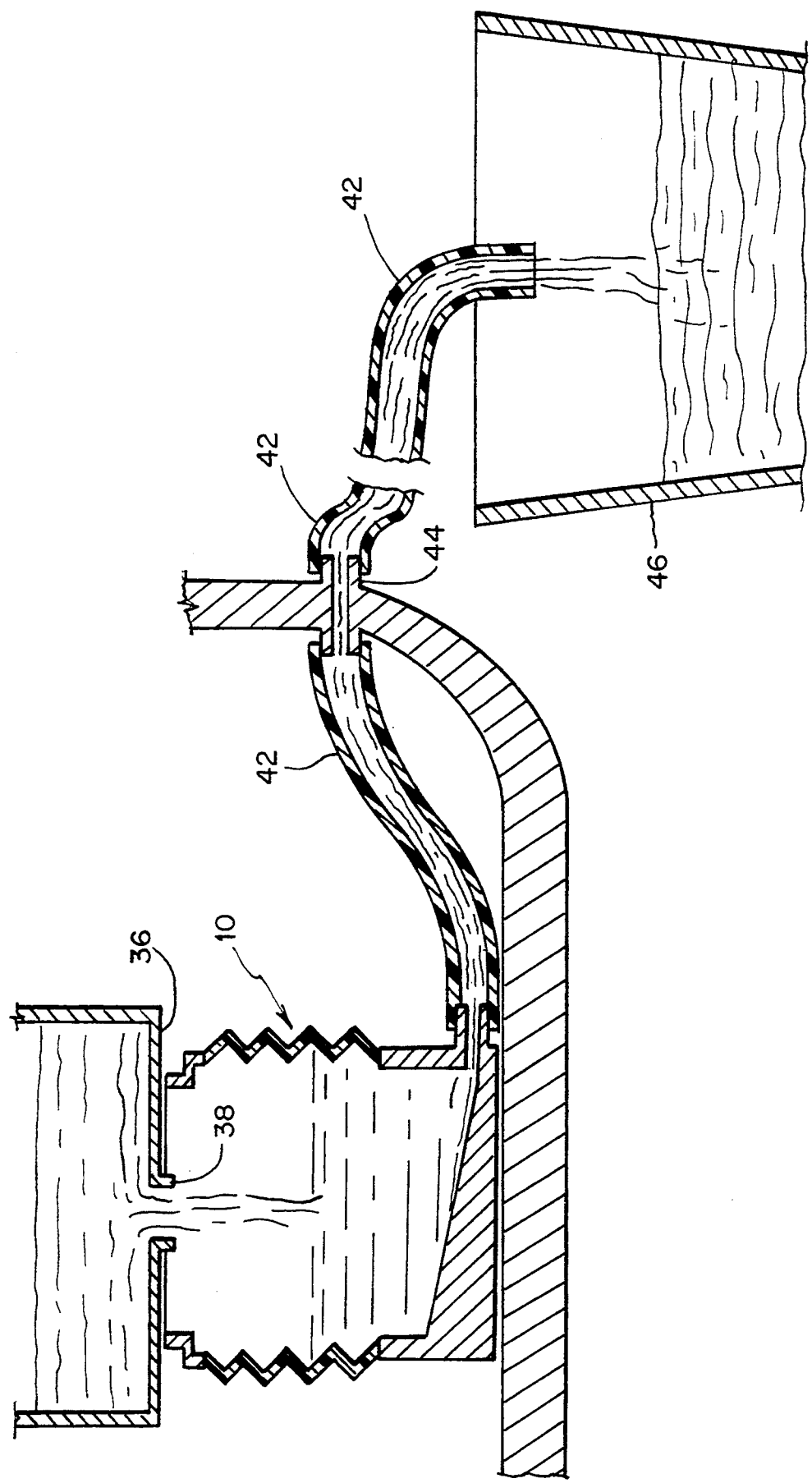

QUICK CHANGE EXPANDABLE OIL PAN

BACKGROUND OF THE INVENTION

This invention relates to apparatus for draining oil from a boat's oil pan in an ecologically safe manner.

The normal procedure for draining the boat's engine oil is to remove the drain plug and drain the oil into the boat's hull or bilge. Then the oil and water in the bilge are pumped over the side of the boat or drained out the hull drain plug at the stern of the boat. After the hull is emptied a mild detergent is dumped into the hull for cleaning and that oily mixture is also pumped over the side or drained out of the hull. The only alternative method is to suck the oil out of the oil pan through the dip stick tube, leaving large amounts of sludge in the oil pan.

SUMMARY OF THE INVENTION

The present invention provides an expandable pan for draining and recovering the boat's engine oil without spilling the oil into the environment.

A preferred embodiment of this invention comprises an expandable oil pan for trapping the oil coming out of the engine's oil pan and transferring the oil to a waiting container where it can be recovered and recycled. The pan, in a collapsed state, is placed under the engine oil pan prior to removing the plug. Once in place, the pan is expanded so it doesn't miss a drop of the oil. Attached to the end of the pan ia a 4 foot, ½ inch hose which is placed so that the open end of the hose is sticking out of the hull drain plug. As the oil drains into the expandable pan it passes down the sloped bottom of the pan and out the hose into a waiting container where it can be recovered and recycled.

It is thus a principal object of this invention to provide apparatus for the safe transfer of oil from the engine oil pan of a boat engine to a container for recovery and recycling.

BRIEF DESCRIPTION OF THE DRAWING

FIG. 1 is an elevation view of a preferred embodiment of this invention with the pan fully expanded.

FIG. 2 is a view similar to that of FIG. 1 with the pan in a collapsed state.

FIG. 3 is a plan view looking down on the pan shown in FIG. 1.

FIG. 4 is an illustrative view of the pan placed in a position to receive and transfer the oil being drained.

DESCRIPTION OF THE PREFERRED EMBODIMENT

Referring to FIGS. 1–3, collapsable pan 10 comprises a bottom member 12 of rectangular cross section forming a well within and having an outlet 14 with a hose fixture 16 on the outside. The interior of bottom member 12 is provided with a false bottom 17 sloped toward outlet 14.

Extending up from the sides of bottom member 12 are collapsible side walls 18, 22, 24, and 26 forming interior space for receiving the oil as will be later described.

At the top edges of the side walls is mounted a top member 28 for enclosing the interior space. Member 28 has an annular lip 32 surrounding a short, vertical extension 34 forming an opening for receiving the oil.

In using expandable pan 10, as seen in FIG. 4, pan 10 in its collapsed state is placed under engine oil pan 36 and then expanded so that extension 34 encloses plug 38 which is removed to permit the oil to drain. The oil entering pan 24 is directed by false bottom 17 to outlet 14.

Attached to hose connection 16 is a hose 42 which passes through hull drain plug 44. The oil draining through outlet 14 passes through hose 42 into a waiting container 46 where the oil can be recovered and recycled.

This invention offers boat owners an ecologically safe and cost effective device for the draining and recovering of their boats' engine oil.

What is claimed is:

1. An expandable pan for trapping and directing oil from an engine within a boat, comprising a bottom member of rectangular cross section with walls forming a well within, collapsible sidewalls having top and side edges extending up from the sides of said bottom joined along their respective side edges forming interior space for accommodating said oil, a top member engaging the top edges of said sidewalls for enclosing said space, said top member having walls extending downwardly to engage said top edges of side walls and a lip extending inwardly at right angles to and from the tops of said top member walls and forming an upwardly directed extension surrounded by said lip for providing access to the interior of said pan, an outlet formed within a wall of said bottom member, said outlet communicating with a hose fixture on the outside of said bottom member for engagement with a length of hose, said bottom member having a false bottom within said well sloped to direct any entering oil to said opening, so that oil entering said pan is directed through said outlet and said length of hose to a waiting container for recovery and recycling, said sidewalls being expanded upwardly when oil is to be collected and collapsed for removal and storage of said pan.

* * * * *